Patented Apr. 17, 1923.

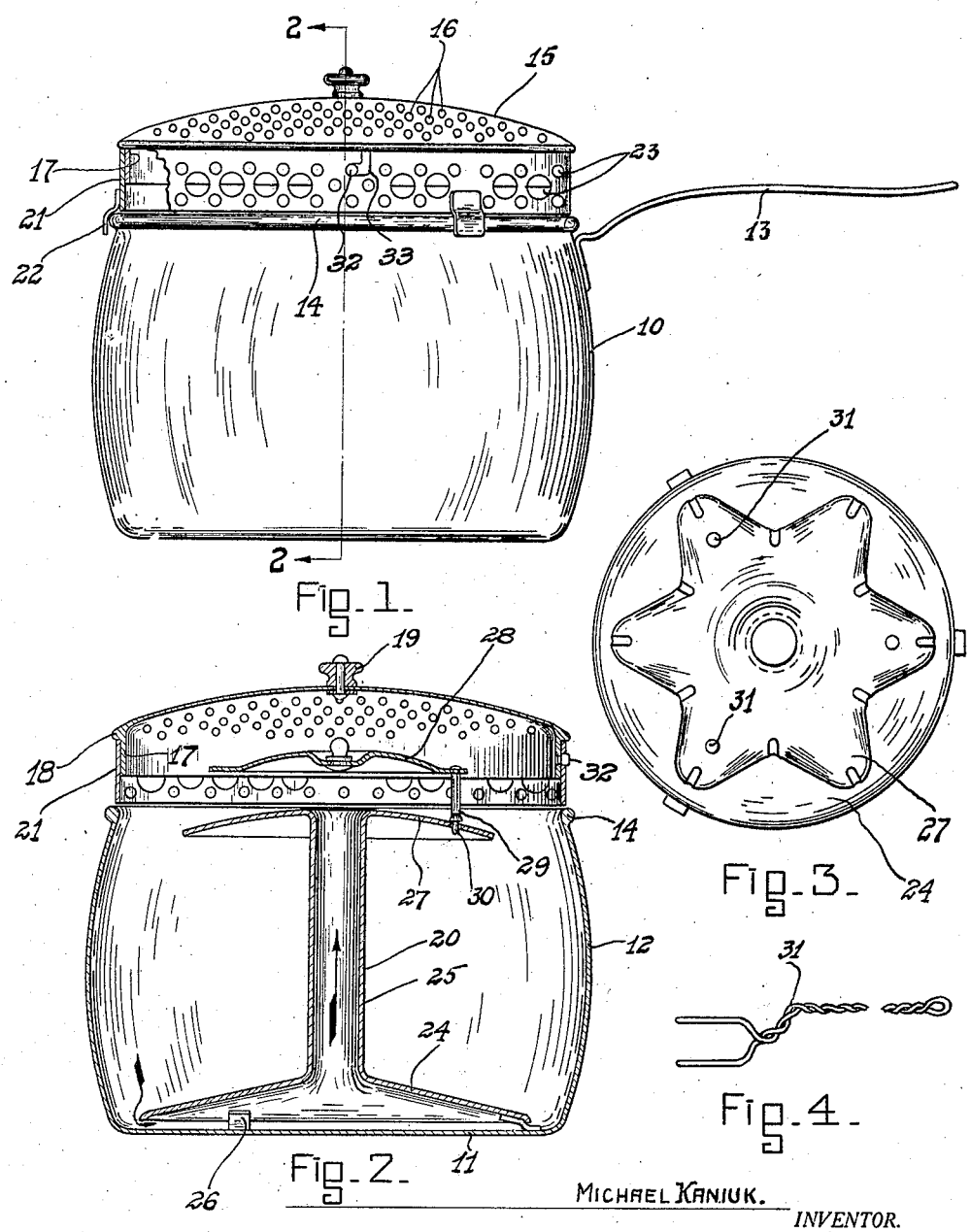

1,452,344

UNITED STATES PATENT OFFICE.

MICHAEL KANIUK, OF BOYERTOWN, PENNSYLVANIA.

MILK BOILER.

Application filed May 1, 1922. Serial No. 557,797.

*To all whom it may concern:*

Be it known that I, MICHAEL KANIUK, a citizen of Ukrainia, residing at Boyertown, in the county of Berks and State of Pennsylvania, have invented certain new and useful Improvements in Milk Boilers, of which the following is a specification.

This invention relates to combination cooking utensils or culinary conveniences and has as its principal object to provide a kettle which may be used in the customary manner and an attachment therefor, so designed that when the kettle is used for boiling milk or similar liquid, the danger of boiling over will be eliminated.

Another purpose is to produce a device that may be readily placed in position in the kettle or removed and which may easily be dismounted for cleaning.

A further aim of the invention is in the provision of an attachment that may be wholly constructed of sheet metal.

These and other objects, which will become more apparent as the description progresses, are attained by the novel construction and arrangement of parts hereafter described and shown in the accompanying drawing, forming part of this disclosure, and in which:—

Figure 1 is a side elevational view of a kettle made in accordance with the invention.

Figure 2 is a vertical sectional view taken on line 2—2 of Figure 1.

Figure 3 is a top plan view of the removable insert, its cap being removed.

Figure 4 is a view of the lid lifting fork.

In the drawing, the numeral 10 designates in its entirety a kettle of ordinary construction, consisting of the flat bottom 11, side wall 12 and handle 13, the latter being provided with the customary bead 14 which acts as a support for the lid.

The lid used in connection with the invention is generally designated by the numeral 15 and consists of a domed top having perforations 16 and provided with a depending flange 17 joined integrally by the beading 18, a knob 19 surmounting the lid at its center.

The attachment used in conjunction with the kettle consists of an insert designated generally by the numeral 20, and an annular ring 21 having a plurality of depending snap hooks 22 at its lower edge extending outwardly to engage over the bead 14 of the kettle to hold the ring in place.

As shown in the drawing, this ring is of such diameter as to receive the flange 17 of the lid or cover and contains a plurality of perforations 23.

Extending from the flange 17 is a knob 32, the same being adapted to enter and engage in an angular slot 33 in the ring 21, thus locking the cover to the ring in the manner of the well known bayonet joint.

The removable insert 20 comprises a concavo-convex base member 24 having a central upwardly extending hollow stem 25 and secured at spaced distances to the underside of the base member are feet 26, three being preferred, on which the insert rests, thus raising it from contact with the bottom 11 of the kettle.

Formed integrally with the upper end of the stem 25 is an out-turned concavo-convex flange 27 which in plan resembles a six pointed star, its edges extending downward as shown in Fig. 3.

A baffle plate 28 is supported in spaced relation above the flange 27, over the passage in the stem 25, by means of posts 29, their lower, reduced ends 30 loosely fitting openings 31 in the flange 27.

In use, the insert 20 is placed in the kettle, which may be filled with liquid to a height below the flange 27, the baffle plate 28 adjusted, also the ring or band 21 and cover 15, the kettle then being placed over a source of heat.

As the liquid boils, it will be obvious that the heated portion will rise in the stem, pass over the surface of the flange 27 causing it to be diverted outwardly towards the wall 12, creating a very complete circulation.

Should a strong ebullition take place, the current passing up through the stem will impinge on the deflector or baffle plate 28 and the liquid returned by it to the interior of the kettle, thus maintaining a continuous circulation, prevent boiling over and the inconvenience and loss consequent thereto.

Steam arising from the boiling liquid will pass out of the perforations in the cover and ring so that no danger from explosion is encountered and any tendency to lift the cover will be overcome.

Should it be desired to use the kettle for ordinary purposes the insert 20 and ring 21 will be removed, the cover then resting on the bead 14 of the kettle in the customary manner.

It has been found desirable, when handling the lid and other elements of the device to make use of a forked member 31, (illustrated in Figure 4) which provides means for easily transporting of the cover.

While the foregoing is descriptive of the preferred embodiment of the device, it will be understood that minor changes may be made without departing from the scope and spirit of the invention as claimed.

Having thus described my invention, what I claim as new and desire to secure by Letters Patent, is:—

The combination with a kettle having a bottom and side wall extending upward therefrom and a removable cover, of an insert comprising a concavo-convex base supported in spaced relation above said bottom, a tubular stem extending upwardly from the raised center of said base, an outturned star-shaped flange on the upper end of said stem, said flange being substantially parallel with said base and integrally connected with it by said stem, a deflector removably supported in spaced relation over said flange and upper end of said stem, a perforated ring adapted to be interposed between the upper edge of the kettle and the cover thereof, means on said ring to resiliently engage the upper edge of said kettle, and means for locking the cover to said ring.

In witness whereof I affix my signature.

MICHAEL KANIUK.